United States Patent
Park

(10) Patent No.: US 8,888,298 B2
(45) Date of Patent: Nov. 18, 2014

(54) METHOD FOR CONTROLLING A PROJECTOR

(75) Inventor: Yong Soo Park, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 280 days.

(21) Appl. No.: 13/377,051

(22) PCT Filed: Jan. 26, 2010

(86) PCT No.: PCT/KR2010/000470
§ 371 (c)(1),
(2), (4) Date: Dec. 8, 2011

(87) PCT Pub. No.: WO2010/143797
PCT Pub. Date: Dec. 16, 2010

(65) Prior Publication Data
US 2012/0075599 A1     Mar. 29, 2012

(30) Foreign Application Priority Data
Jun. 9, 2009 (KR) ................ 10-2009-0051053

(51) Int. Cl.
*G03B 21/20* (2006.01)
*H04N 5/74* (2006.01)
*G03B 21/16* (2006.01)
*G03B 21/14* (2006.01)

(52) U.S. Cl.
CPC ............... *G03B 21/14* (2013.01); *G03B 21/20* (2013.01); *G03B 21/16* (2013.01)
USPC ........................................... 353/85; 348/748

(58) Field of Classification Search
CPC ............................. G03B 21/16; G03B 21/2053
USPC ............... 353/85, 57, 58; 362/373, 294, 345; 348/748

See application file for complete search history.

(56) References Cited

U.S. PATENT DOCUMENTS

| 7,918,564 | B2 * | 4/2011 | Hsu et al. ........................ 353/57 |
| 2005/0024600 | A1 | 2/2005 | Cole et al. ...................... 353/85 |
| 2006/0290895 | A1 | 12/2006 | Park et al. ...................... 353/61 |
| 2007/0024823 | A1 * | 2/2007 | Chung ............................ 353/85 |

FOREIGN PATENT DOCUMENTS

| JP | 2006-330147 A | 12/2006 |
| JP | 2008-227127 A | 9/2008 |
| JP | 2009-063798 A | 3/2009 |
| KR | 10-2005-0013507 A | 2/2005 |
| KR | 10-2007-0039458 A | 4/2007 |

OTHER PUBLICATIONS

International Search Report dated Sep. 7, 2010 issued in Application No. PCT/KR2010/000470.
Korean Notice of Allowance dated Oct. 26, 2011 issued in Application No. 10-2009-0051053 (with English translation).

* cited by examiner

*Primary Examiner* — William C Dowling
*Assistant Examiner* — Ryan Howard
(74) *Attorney, Agent, or Firm* — Ked & Associates, LLP

(57) ABSTRACT

The present invention relates to a method for controlling a projector. More particularly, the present invention relates to a method for controlling a projector that enables a projector to operate even when the temperature of the ambient air exceeds a predetermined temperature, and prevents the operation of the projector from being forcibly terminated even when the inside of the projector overheats beyond a predetermined temperature.

19 Claims, 6 Drawing Sheets

METHOD FOR CONTROLLING A PROJECTOR

TECHNICAL FIELD

The present invention relates to a control method of a projector that enables the projector to operate even in case a temperature of external air is higher than a predetermined temperature, and that enables the projector not to finish operation forcibly even in case an inside of the projector is overheated to a predetermined temperature or higher.

BACKGROUND ART

Projectors are electric appliances, which enlarge and project a projected light converted from an image signal supplied outside to a screen. A light supplied by a light source such as a lamp provided in such a projector is composed with an image only to be the projected light projected to the screen.

The lamp used as light source is mounted in a projector-housing and it has a large heat value. Moreover, the projector includes a circuit board having various circuit parts installed thereon and composition system parts composing a converted image from an image signal with the light supplied by the lamp, which have large heat values also.

As a result, the projector includes a cooling fan and a temperature sensor and it decrease or increase the speed of the cooling fan to cool its inside according to a temperature of its inside.

However, if the temperature inside the projector increases to a predetermined value or higher, a conventional cooling method changes the rotation speed of the cooling fan based on information about the increased temperature. For example, if the temperature inside the projector increases, the rotation speed of the cooling fan is increased. If the temperature inside the projector decreases, the rotation speed of the cooling fan is reduced.

If the temperature of external air is higher than a predetermined value, the conventional projector may not start operation to secure product reliability and to protect its parts even when a user starts the projector. That is, if the temperature of external air is higher than a predetermined temperature that is appropriate for parts mounted in the projector to start operation, it is usual to finish the operation of the projector forcibly or to control the projector stopped, regardless of overheating of the parts mounted in the projector.

However, according to the conventional control method of the projector, it is assumed that the temperature of external air is always in regular proportion to the temperature inside the projector. It would be inconvenient of user to determine whether to operate the projector regardless of the overheating of the important parts provided in the projector.

Especially, if the temperature of external air is higher than a predetermined temperature, the projector fails to operate itself and then the user might doubt a malfunction of the projector, with losing reliability of the projector.

Because of that, even in case the temperature of external air is higher than the predetermined temperature, the projector may be useable and there is necessity for a control method of the projector enabling the projector not to finish operation forcibly even in case the temperature inside the projector is overheated to be higher than the predetermined temperature.

DISCLOSURE OF INVENTION

Technical Problem

To solve the problems, an object of the present invention is to provide a control method of a projector that is able to operate the projector even if the temperature of external air is higher than a predetermined temperature and which is able not to finish operation of the projector forcibly even if an inside of the projector is overheated at a higher temperature than a predetermined temperature.

Technical Solution

To achieve these objects and other advantages and in accordance with the purpose of the invention, as embodied and broadly described herein, a method for controlling a projector includes a temperature measuring step measuring a temperature of a projector; a light source part output determining step determining a light source part to be rated-output if the temperature measured in the temperature measuring step is a predetermined temperature or lower and to be attenuated-output if the temperature measured in the temperature measuring step is the predetermined temperature or higher; and a light source part controlling step controlling the light source part according to the light source part output determined in the light source part output determining step.

The projector may include at least one cooling fan and if the light source part output determining step determines a light source part to be attenuated-output, the at least one cooling fan may be controlled to be attenuated-output.

The light source part controlling step controlling the light source part to be attenuated-output based on the light source part output determined in the light source part output determining step may be operated for a predetermined time period.

The temperature measuring step may be repeated at a predetermined interval and the light source part output determining step may determine the light source part to be rated-output and the light source part controlling step controls the light source part to be rated-output, in case the temperature of the projector decreases down to a predetermined temperature or lower during the light source part controlling step.

The temperature of the projector may include at least one of a temperature inside the projector and a temperature of air discharged from the projector.

The temperature inside the projector may include at least one of a temperature of area near the light source part and a temperature of area near a display panel.

In another aspect of the present, a method for controlling a projector includes a temperature measuring step measuring a temperature of external air drawn into the projector to cool the projector and a temperature of internal air discharged from the projector; a light source part and cooling fan output determining step determining output of a light source part and cooling fan, respectively, which are provided in the projector, based on the external air temperature and temperature difference between the internal air temperature and the external air temperature; and a light source part and cooling fan controlling step controlling the light source part and the cooling fan based on the light source part and cooling fan output determined in the light source part and cooling fan output determining step.

The temperature measuring step and the light source part and cooling fan output determining step may be repeated at a predetermined interval.

the light source part and cooling fan output determining step may determine the light source part and the cooling fan to be rated-output in case the external air temperature measured in the temperature measuring step is a first temperature or lower and the temperature difference is a first value or lower.

The light source part and cooling fan output determining step may determine the light source part and the cooling fan to be attenuated-output, which is less than the rated-output, in case the external air temperature measured in the temperature measuring step is the first temperature or lower and the temperature difference is the first value or higher.

The light source part and cooling fan output determining step may determine the light source part to be attenuated-output in case the temperature difference is maintained at the first value.

The light source part and cooling fan output determining step may determine the light source part and the cooling fan to be rated-output in case the temperature difference is decreased down to the first value or lower.

The light source part and cooling fan output determining step may determine the light source part and the cooling fan to be attenuated-output, which is less than the rated-output, and the light source part and cooling fan controlling step may control the light source part and the cooling fan to be attenuated-output for a predetermined time period, in case the projector is put into initial operation in a state of the external air temperature measured in the temperature measuring step being higher than the first temperature and lower than the second temperature.

The light source part and cooling fan output determining step may determine the light source part and the cooling fan output to be rated-output in case the temperature difference between the inlet air temperature and the outlet air temperature is a second value or lower.

The light source part and cooling fan output determining step may determine the light source part and the cooling fan to be attenuated-output and the light source part and cooling fan controlling step may control the light source part and the cooling fan to be attenuated-output for a predetermined time period, in case the temperature difference between the external air temperature and the internal air temperature is the second value or higher.

The attenuated-output may be substantially more than 75% and less than 100% of the rated-output.

The attenuated-output of the light source part may be 80% of the rated-output of the light source.

The attenuated-output may be substantially the least output which is controllable.

The first temperature may be a temperature between 35° C. and 40° C.

The second temperature may be a temperature of 40° C. or more.

Advantageous Effects

The present invention has following advantageous effects.

The control method of the present invention can make the projector operable even if the temperature of air inside space having the projector used therein is higher than a predetermined temperature.

As a result, the projector may be usable even in an area having relatively high external air and user convenience may be improved.

Furthermore, the control method of the present invention can make the operation of the projector not finished forcibly, even if the projector inside is overheated at a higher temperature than a predetermined temperature.

A still further, the control method of the present invention can make the projector inside not overheated at a higher temperature, even if the projector is used for a relatively long time.

BRIEF DESCRIPTION OF THE DRAWINGS

The accompanying drawings, which are included to provide further understanding of the disclosure and are incorporated in and constitute a part of this application, illustrate embodiments of the disclosure and together with the description serve to explain the principle of the disclosure.

In the drawings.

BEST MODE

Figure 1:
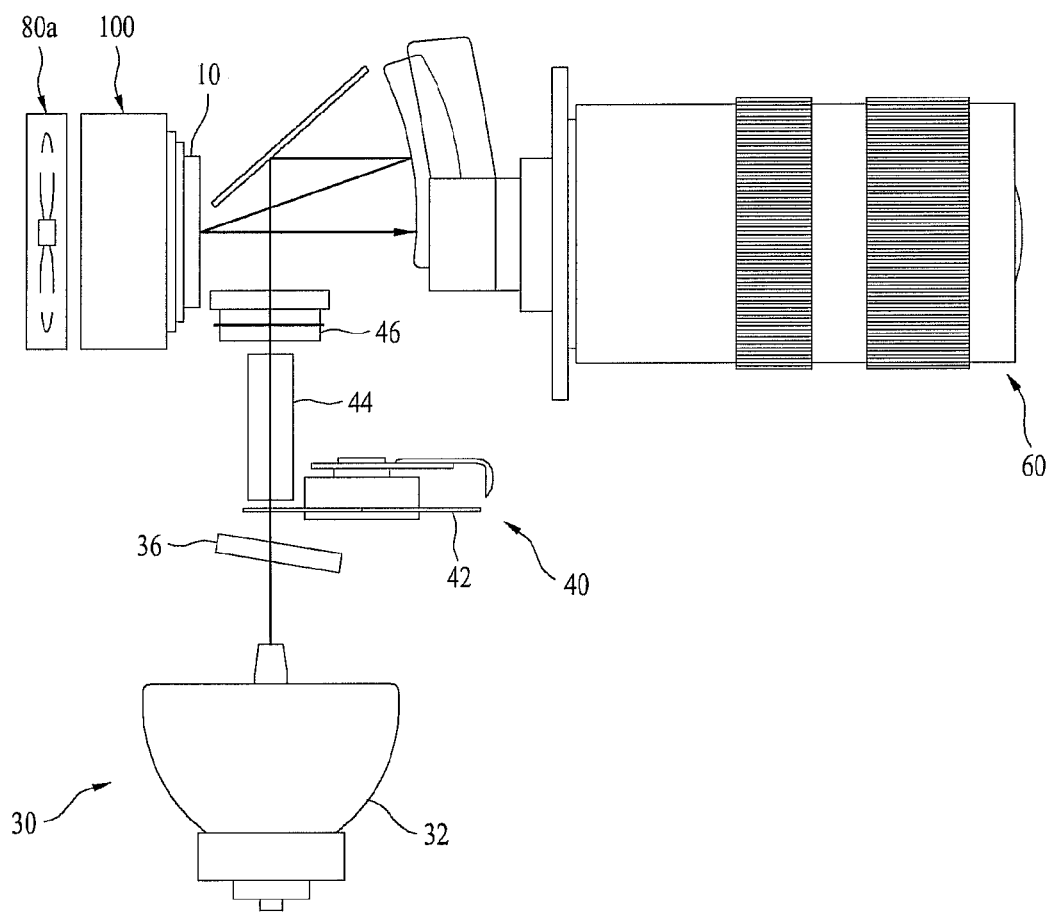
FIG. 1 is a diagram schematically illustrating a DLP (Digital Light Processing) projection type projector.

Reference will now be made in detail to the specific embodiments of the present invention, examples of which are illustrated in the accompanying drawings. Wherever possible, the same reference numbers will be used throughout the drawings to refer to the same or like parts.

A control method of a projector is disclosed and more particularly the present invention discloses a control method to cool down a projector.

Generally, projectors are electric appliances that display a projected light converted from an image generated by a display module to a large screen by using a projection lens. Such a projector may be categorized based on an image display method into CRT (Cathode Ray Tube) projection type, LCD (Liquid Crystal Display) projection type, LCOS (Liquid Crystal on Silicon) projection type and DLP (Digital Light Processing) projection type.

The CRT projection type projects an image signal of an external device after amplified by a CRT to a screen and it may be referenced to as beam projector. Such the CRT projection type projector includes a single CRT tube projection type and three-CRT tube projection type. Recently, the LCD projection type and LCOS projection type and the DLP projection type have been popular.

The LCD projection type uses electric optical characteristics of liquid crystal in a display module. After light sources of the lamp transmit transmissive panels, respectively, the lights are composed into a single image via a polarization prism to be enlargedly projected to the screen.

The above types of projectors usually use a lamp as light source. As a result, lamp light source is divided R, G and B spectral lights to be used.

As the lights provided by the light source are continuously transmitted via or reflected on optical parts provided in the projector, temperatures of the optical parts may increase. Also, the display module converts the image signal transmitted from outside into the transmitting images and the optical parts are continuously exposed to the spectral light for each color transmitting or being reflected on the optical parts, such that the optical parts may have quite heat values.

Although there may be no problem in an initial operation of the projector, the internal temperature of the projector may increase continuously enough to cause a problem of product reliability.

As a result, it is necessary to invent a cooling method of the projector in order to guarantee consistent usage of the projector before the inside of the projector is overheated.

As mentioned above, the projector used a lot nowadays include diverse types and a control method of a projector according to an exemplary embodiment of the present invention will adapt a DLP projection type projector as follows.

The DLP projection type uses a DMD (Digital Mirror Device) developed by TI (Texas Instrument) established in the U.S. a light generated from a lamp transmits a color wheel and the light is reflected on the DMD chip to be magnifiedly projected. The DMD chip is a semiconductor optical switch that selectively reflects the light after a micro-mirror switching a light thousands times per second and it has ±10° oblique for every on and off state of each aluminum alloyed micro-mirror having the size of 16 μm formed in unit cells of SRAM (Static Random Access Memory).

FIG. 1 is a diagram schematically illustrating the DLP projection type projector.

The light source part 30 may be a lamp or LED (Light Emitting Diode) capable of generating a light by using a supplied power. This embodiment uses a lamp as the light source.

The light source part 30 includes a lamp (not shown) for emitting a light, that is, a white light and a lamp case 32 for protecting the lamp. A reflector may be provided in an inner surface of the lamp case 32 to collect the lights emitted from the lamp.

The light emitted from the light source part 30 transmits a color wheel assembly 40.

The color wheel assembly 40 includes a color wheel 42 and a motor (not shown). The color wheel 42 is rotated at a high rotation number, with divided portions for red, green and blue, respectively.

A heat radiation pin or fan may be provided in the color wheel assembly 40 to cool the motor. An ultraviolet ray (UV) blocking filter 36 may be provided between the lamp assembly 32 and the color wheel assembly 40 to remove a UV ray from the light outputted from the lamp.

The color wheel 42 is formed in a disc-shape having a predetermined diameter and the disc has divided portions for red, green and blue, respectively. As a result, an unpolarized one of the lights collected by the reflector of the light source part 30 is spectralized to one of the red, green and blue by the colors of the color wheel 42.

Moreover, a light tunnel 44 is provided in a direction of the light having transmitted the color wheel assembly 40. Here, the light tunnel 44 may be referenced to as rod lens and it makes a color light transmitting the color wheel 42 uniform.

Four long rectangular-shaped mirrors are jointed, oppositely facing each other, to form the light tunnel 44. The light tunnel totally or diffusedly reflects the lights divided into red, green and blue lights via the color wheel assembly 40 to make brightness of the lights distributed uniformly.

An illumination lens 46 is provided in a direction of the light from the light tunnel and the illumination lens 46 collects the lights having transmitted the light tunnel 44.

The lights collected by the illumination lens 46 are reflected by a mirror 50 or aspheric mirror 52 to be projected toward the DMD module 10. The DMD module 10 converts an image signal supplied from the outside into a transmitting image and it converts the emitted light into a projected light to supply the projected light to a projection lens assembly 60.

The projection lens assembly 60 magnifies and projects the projected light reflected by the DMD module to the screen.

The projection lens assembly 60 is configured of a convex lens and concave lens collecting or emitting the lights to make images of the lights optically.

Furthermore, a cooling device 100 may be provided to cool or heat-radiate the heat generated by the DMD module 10. The cooling device 100 is in close contact with a rear surface of the DMD module 10 to cool down the DMD module 10. The cooling device 100 may be formed of metal having a high thermal conductivity such as aluminum. A first cooling fan 80a is provided in a rear surface of the cooling device 100 to blow air such that the cooling device 100 may be cooled down.

According to the above configuration, the image signal supplied from the outside may be converted into the projected light to be projected.

The projector shown in FIG. 1 embodies the DLP type projector out of the diverse types of projectors. a control method of a projector according to another embodiment of the present invention which will be described as follows is not limited to the DLP type projector and the control method may be applicable to any types of projectors including a temperature sensor to determine overheat.

Figure 2:
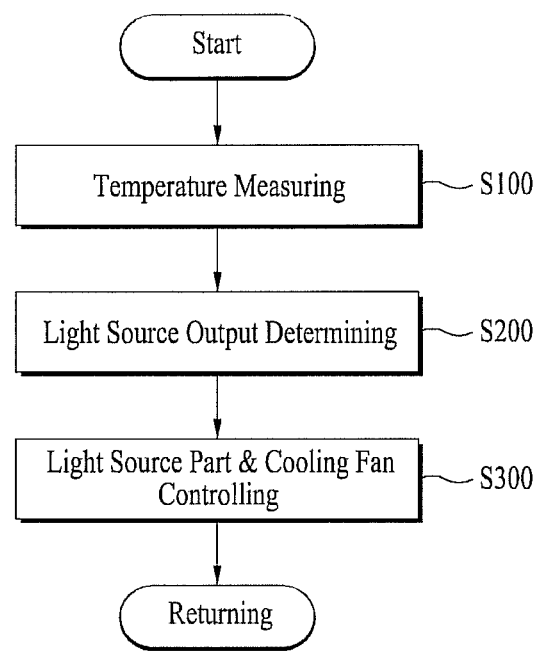
FIG. 2 is a block view illustrating a control method of the projector according to an exemplary embodiment of the present invention.

FIG. 2 is a block view illustrating the control method of the projector according to another embodiment of the present invention. It is assumed that a projector controlled according to the control method of this embodiment includes at least one temperature sensor capable of measuring a temperature of the projector.

According to this embodiment shown in FIG. 2, the control method of the projector includes a temperature measuring step (S100) measuring a temperature by using at least one temperature sensor provided in the projector, a light source part and cooling fan output determining step (S200) determining output of a light source part and cooling fan of the projector, and a light source part and cooling fan controlling step (S300) controlling the projector based on the determined output.

The temperature measuring step (S100) measures a temperature directly or indirectly presenting an internal temperature of the projector to determine overheat inside the projector by using the at least one temperature provided in the projector. For example, the temperature of the projector may include an internal air of the projector or a temperature of outlet air exhausted from the projector. Detailed description of this configuration will be described later.

The light source part and cooling fan output determining step (S200) determines output of each component provided in the projector based on the temperature information measured in the temperature measuring step (S100).

The components of the projector of which output to be determined may be a light source part or a plurality of cooling fans. The output of the light source part may mostly affect the internal temperature of the projector and the rotation speed, that is, the output of the cooling fans may be adjustable to prevent the overheat of the projector inside.

As a result, the light source part and cooling fan controlling step (S300) controls the light source or cooling fans according to the determined output.

The light source part and the cooling fan are elements generating heat during the operation. Only if the heats of the light source part and cooling fan are controlled by the output control, it can be said that the light source part and the cooling fans are controlled.

Figure 3:
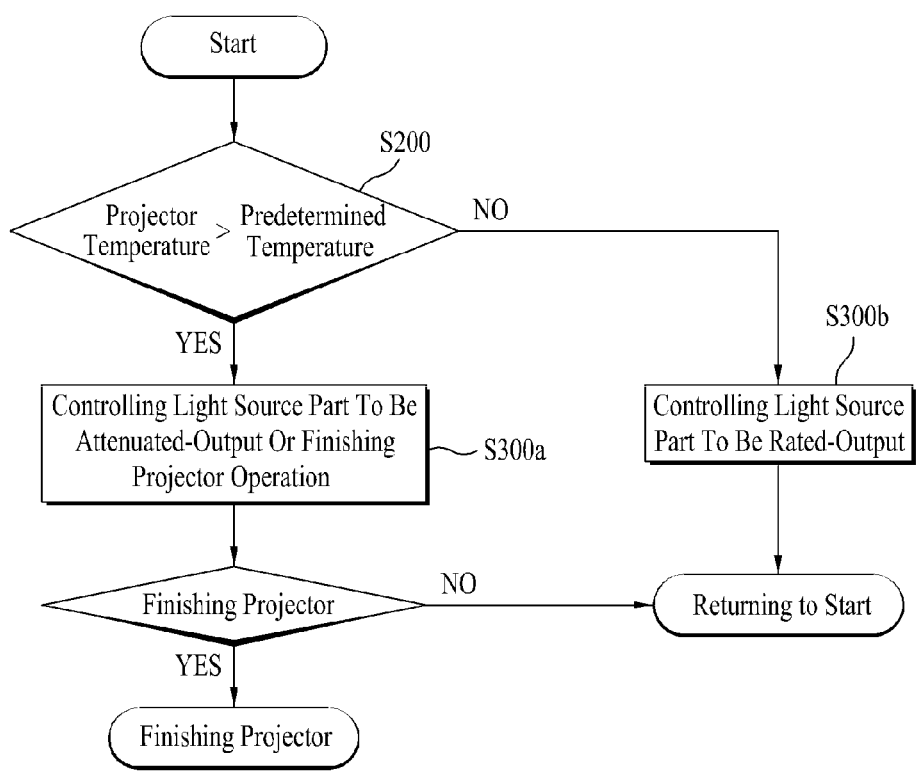
FIG. 3 is a control method of the projector according to another embodiment of the present invention.

FIG. 3 illustrates a control method of a projector according to another embodiment of the present invention.

If it is determined that the temperature of the projector is higher than a predetermined temperature, the light source part and cooling fan output determining step (S200) determines the light source to be attenuated-output or to finish the operation of the projector (S300a).

It means a case of failing to operate the projector normally that the temperature of the projector is higher than the predetermined temperature and it means a state of the projector having quite a high internal temperature.

If it is determined that the predetermined temperature is higher than a temperature required to operate the projector normally, the light source part and cooling fan output determining step (S200) may the operation of the projector.

As a result, the predetermined temperature may include at least two temperatures and a temperature range may be determined by the predetermined temperature. It may be determined based on the determined temperature range whether to rated-output the light source part or to finish the operation of the projector.

This configuration will be described in detail later.

If the temperature of the projector is lower than the predetermined temperature, the light source part and cooling fan output determining step (S200) determines that the light source part and cooling fan are attenuated-output.

The temperature of the projector according to the control method of the projector shown in FIG. 2 may be temperatures measured by at least two temperature sensors provided in the projector. That is, the temperature of the projector measured in the temperature measuring step (S100) may include at least two tips of temperature information and the light source part and cooling fan output determining step (S200) may determine the output of the light source and cooling fan based on the plural tips of temperature information (S300b).

The reason why the temperature of the projector measured in the temperature measuring step (S100) is at least two tips of temperature information is that overheat or possibilities of the projector inside has to determined acutely.

For example, the measured temperature of the projector may include external and internal temperatures of the projector.

The projector can operate or fails to operate based on the temperature of installation space which is the external temperature. If the temperature outside the projector which is an external air temperature is approximately 37° C. or higher, the conventional projector fails to operate, specifically, fails to start.

If an indoor temperature increases in summer, the projector put into operation happens to finish its operation or it fails to start the operation even when turned on.

If the temperature of the projector reaches a predetermined temperature, the operation will be forcibly ended to project inner parts. Even a start signal is inputted, the projector will not start to operate.

However, according to the control method of the present invention, the projector can be operated even if the temperature of the projector reaches the predetermined temperature or higher.

According to the present invention as mentioned above, if it is determined that the temperature of the projector is higher than the predetermined temperature, the light source part and cooling fan output determining step (S200) determines the light source is rated-output to minimize the heat generated inside the projector and to cool the projector efficiently.

That is, the light source is determined to be rated-output which is a lower output than an attenuated output, such that the generated heat inside the projector may be reduced as much as possible and that the projector may be cooled slowly without stopping the operation of the projector.

If the projector is overheated, the control method of the projector according to the present invention may not finish the operation of the projector but make an overall capacity of the projector downer to try the cooling of the projector with the least generated heat.

The method of downing the overall capacity of the projector may be embodied by a method of adjusting outputs of parts having the largest energy consumption and heat generation.

As a result, the above light source part is controlled to be attenuated-output and the output (rotation speed) of at least one cooling fan may be determined to be attenuated-output like the light source part.

If the cooling fan is rotated at a high rotation number, noise and generated heat will increase. As a result, the method of attenuating the rotation speed which is the controlling of the attenuated-output may be used, not increasing the rotational speed.

The plurality of the cooling fans may be provided in the projector and at least one cooling fan having the relatively large capacity and generated heat is controlled to be attenuated-output to cool the projector.

As follows, a detailed control method for cooling the projector will be described in reference to FIG. 4.

Figure 4:
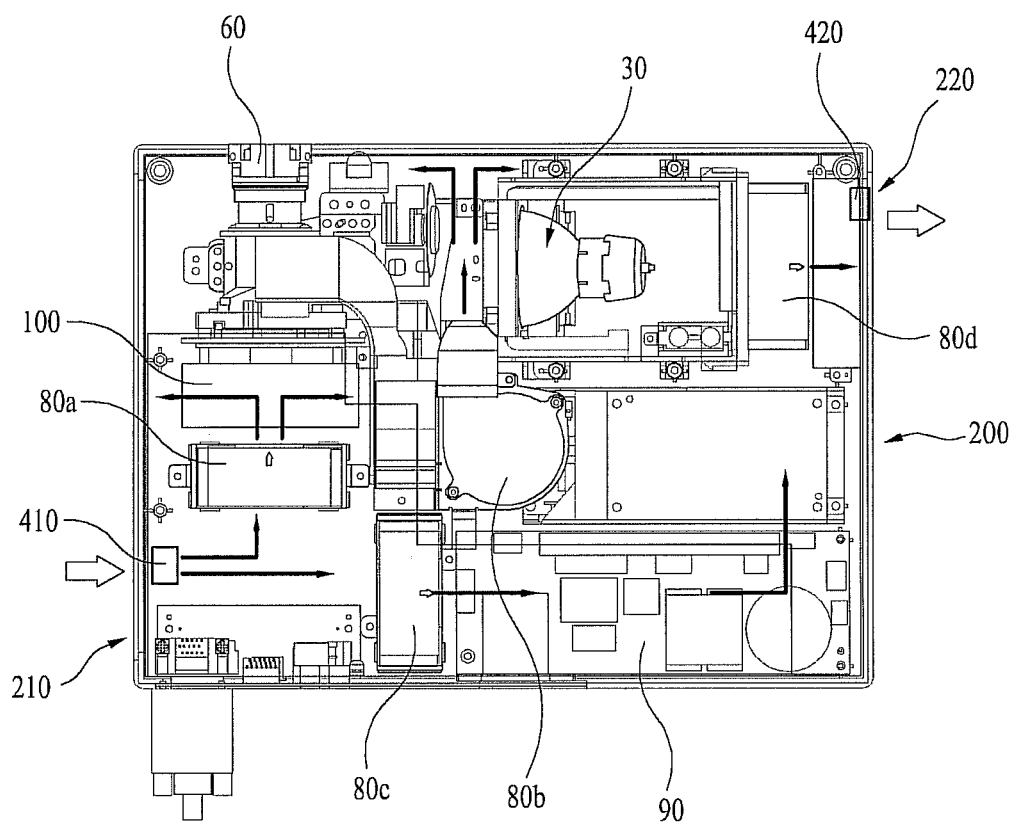
FIG. 4 is a plane view of the projector to illustrate air flow inside the projector.

FIG. 4 is a plane view of the projector to illustrate air flow inside the projector.

The conventional projector has optical parts mounted in a housing 200 defining its exterior appearance as shown in FIG. 1 and a lens of a projection lens assembly 60 exposed outside. The housing 200 protects the inner parts mounted in the projector and it includes an air inlet 210 to suck air used to cool the inner parts and an air outlet 220 to discharge the air having cooled the inner parts.

The air inlet 210 and the air outlet 220 may be formed in one of outer sides of the housing 200. The projector shown in FIG. 4 includes the air inlet 210 and the air outlet 220 formed in right and left side surfaces of the housing 200, respectively. The air inlet 210 and the air outlet 220 have a net structure to prevent foreign substances from passing there through.

According to the projector shown in FIG. 4, a single air inlet 210 and a single air outlet 220 may be provided in the housing 200 and a plurality of air inlets and air outlets may be provided to improve cooling efficiency.

Specifically, a first cooling fan 80a may be provided in a rear surface of a cooling device 170 to cool the DMD module 10 intensively and a second cooling fan 80b blowing air toward the light source part may be further provided adjacent to the light source part 30 to cool the light source. A third cooling fan 80c may be provided to cool the power supply part 90 and a fourth cooling fan 80d may be provided adjacent to the air output 220 to exhaust internal air of the housing 200 forcibly.

As not shown in the drawings, an auxiliary cooling fan may be provided to cool the optical parts subject to overheat, for example, the color wheel 42 and the light tunnel 44.

Since the plurality of the cooling fans are provided in the housing 200, the inner parts of the projector may be cooled, not overheated.

At least one temperature sensor may be provided in the projector to determine whether the inside of the projector is overheated. The best way is measuring a temperature of each part by using each corresponding temperature sensor and selectively controlling each corresponding cooling fan based on the result of the overheat determination, in order to determine the overheating of each inner part. However, the temperature sensor corresponding to the parts would increase product expense and it is preferable to indirectly determine whether the inside of the projector is or will be overheated. The lamp of the light source part 30 has a high temperature not measured directly and the size of the display module is quite compact such that it is not easy to measure the temperature of the display module directly.

In addition, the external air temperature of the projector is an important operation variable of the control method to cool the projector. that is, if the temperature of the external air which is the air outside the projector is relatively high, the projector is easy to overheat and it is usually set not to re-start or to stop operation forcibly to prevent the overheat.

As a result, it is preferable that it is determined based on the measured temperature of the internal air exhausted from the projector whether the projector inside is overheated and that the cooling fans are controlled flexibly based on the measured temperature. the cooling fans may be causes of noise and it may cause unnecessary noise to operate the cooling fans at the maximum output, with assumption of the projector inside's overheat or its overheatible condition. Thus, it is required to invent the method for operating the cooling fans selectively based on conditions of the cooling fans.

As shown in FIG. 4, the projector controlled based on the control method of the projector according to the present invention may include temperature sensors adjacent to the external air inlet 210 and the internal air outlet 220, respectively.

A first temperature sensor 410 provided adjacent to the external air inlet 210 indirectly measures the temperature of the drawn air and a second temperature sensor 420 measures the temperature of the air discharged after cooling the projector inside, such that the overheat condition of the projector inside may be determined indirectly.

The second temperature sensor 420 provided adjacent to the internal air outlet 220 may minimize the number of temperature sensors required to determine overheat of the projector inside and it may be used as material capable of determining overall temperatures of predetermined parts difficult to measure.

As follows, the control method of the projector according to the present invention will be described in reference to FIG. 5.

Figure 5:
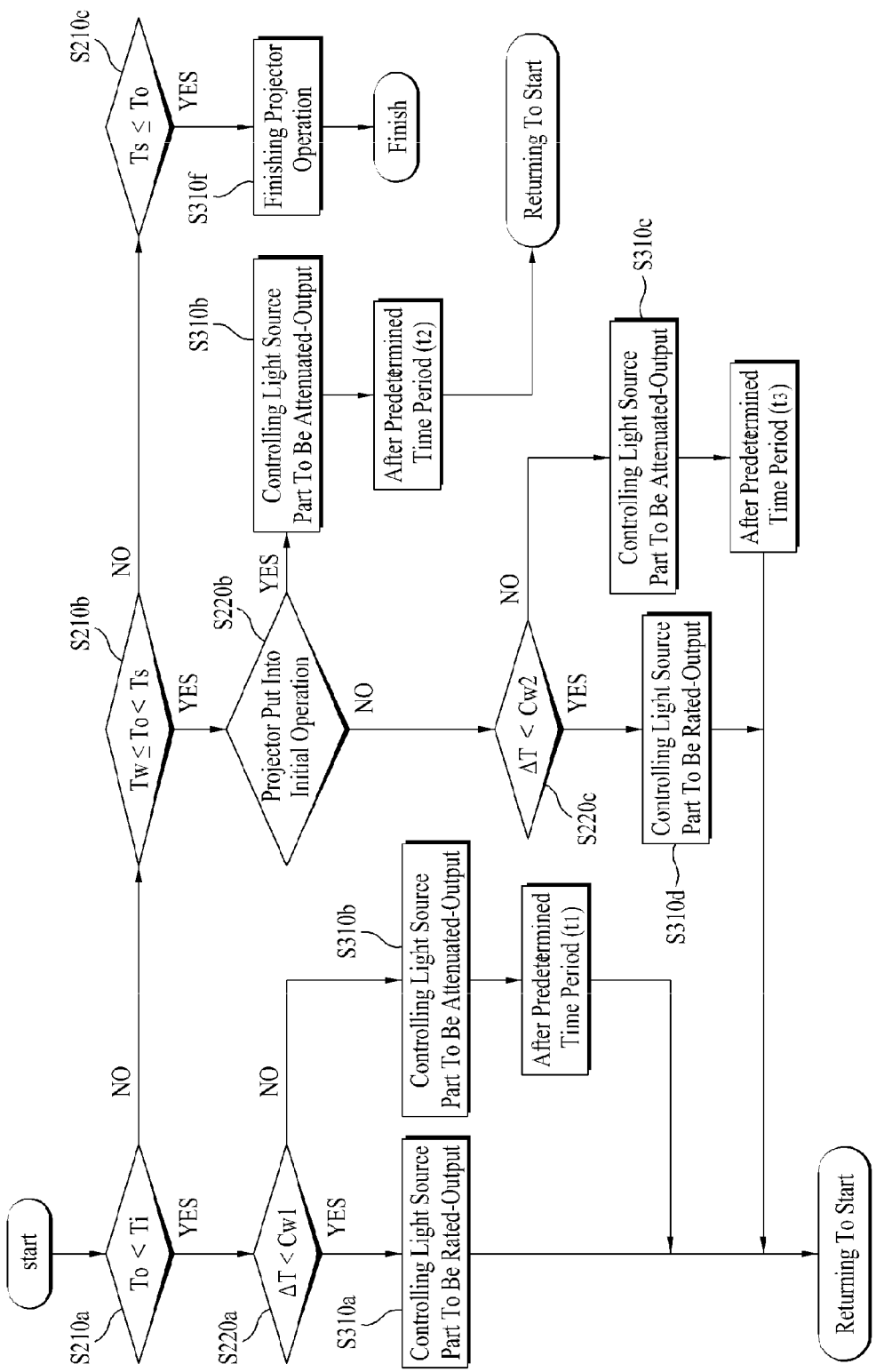
FIG. 5 is a block view specifically illustrating the control method of the present invention.

FIG. 5 is a block diagram specifying the control method of the projector according to the present invention.

As mentioned above, the control method of the projector includes the temperature measuring step (S100) measuring the temperature of the projector by using the temperature sensors provided in the projector and the output determining step (S200) determining the output of the light source part and cooling fan based on the measured temperature.

The temperature measuring step (S100) measures the temperatures of the air drawn into the projector and the air discharged outside from the projector by using the first and second temperature sensors 410 and 420 provided adjacent to the external air inlet 210 and internal air outlet 220, respectively.

As mentioned above, the operational conditions of the projector are in close relation with the temperature of the external air. Because of that, the temperature of the external air is indirectly measured by measuring the temperature of the air sucked into the projector by using the first temperature sensor 410.

The internal air of the projector is indirectly measured by measuring the temperature of the air exhausted from the projector by using the second temperature sensor 420.

For convenience sake, the temperature measured by the first temperature sensor 410 is referenced to as 'external air temperature (To)' and the temperature measured by the second temperature sensor 420 is referenced to as 'internal air temperature (Ti)'. In case the projector is put into operation, it is typical that the internal air of the projector is higher than the external air and a temperature difference ($\Delta T$) is defined as a value get after subtracting the external air temperature (To) from the internal air temperature (Ti).

Variables to determine the output in the output determining step (S200) may the external air temperature (To) and the temperature difference ($\Delta T$).

As follows, the output determining step (S200) determining the output of the projector by using the temperature measured by the temperature measuring step (S100) will be described in detail.

The control method of the projector according to the present invention has a unique characteristic of operating the projector or not stopping the operation even if the temperature of external air is higher than a first temperature (Tw, Warning Temperature), different from the conventional one of the projector.

The first temperature (Tw, Warning Temperature) is a temperature making the conventional projector not operated normally, for example, 40° C. or lower and it may be the temperature of indoor having an air conditioner stopped to operate in hot summer.

In a temperature higher than the first warning temperature (Tw, Warning Temperature), the conventional projector will not start operation even with a start signal inputted by the user or it will stop operation to protect the parts provided inside the projector.

However, it may be inconvenient of the user not to use or start the projector in the temperature near the first warning temperature (Tw, Warning Temperature).

The output determining step (S200) included in the control method of the projector according to the present invention uses the external air temperature (To) as first variable determining the output of the light source part and the like.

The external air temperature (To) may be compared with a second temperature (Ts, Shut down Temperature) rather than with the above first temperature (Tw, Warning Temperature), to secure projector-inner-part protection and reliability.

The second temperature (Ts, Shut down Temperature) is the temperature of extreme external air making the projector not operated. That is, the second temperature (Ts, Shut down Temperature) is a high temperature of indoor air with the installed projector, which is capable of stopping the projector. for example, the second temperature (Ts, Shut-down Temperature) may be in the early 40° C.

As a result, it has to be determined whether the external air is included in a temperature range of the first temperature (Tw) and a temperature range of the second temperature (Ts), before determining the output of the light source part.

The output determining step (S200) includes first to third external air comparing steps (S210*a*, S210*b* and S210*c*)

The control method of the projector may be differentiated according to a case of the external air temperature (To) lower than the first temperature (Tw), a case of the external air between the first temperature (Tw) and the second temperature (Ts) and a case of the external air temperature (To) higher than the second temperature (Ts).

Moreover, the output determining step (S200) includes first and second temperature difference comparing steps (S220*a* and S220*c*) comparing the temperature difference that is a value gained by subtracting the external air temperature (To) from the internal air temperature (Ti).

As mentioned above, the variables for determining the output of the light source part and the like in the output determining step (S200) may be the external air (To) and the temperature difference (ΔT).

However, the first to third external air temperature comparing steps (S210a, S210b and S210c) have difference conditions based on the external temperature (To), respectively, which will be described from now on.

First of all, in case the external air temperature (To) is lower than the first temperature (Tw, Warning Temperature) and the temperature difference (ΔT) is smaller than the value of the first temperature (Tw), it can be determined that the projector inside is not overheated because the temperature of the installation space of the projector is not so high and the temperature difference (ΔT) is not so large.

As a result, if the external air temperature (To) is lower than the first temperature (Tw) with the temperature difference (ΔT) smaller than a first value (Cw1), the light source part and cooling fan controlling step may control the light source to be rated-output.

Here, rated-output means that guaranteed usage limit of the lamp configured of the light source part is indicated by output of a corresponding device and the rated-output means output applied to the light source in a normal condition.

If the external air temperature (To) is lower than the first temperature (Tw) with the temperature difference (ΔT) smaller than the first value (Cw1), the light source part is controlled to be rated-output and it may be used normally.

Since the external air temperature (To) is lower than the first temperature (Tw) in general environments, the light source part and cooling fan may be operated at the rated-output in an initial operation period of the projector like the first light source part and cooling fan controlling step (S310a). if the temperature difference (ΔT) is larger than the first value (Cw1) in the second temperature difference comparing step (S220c) because of increase of the temperature inside the projector, the light source part including a predetermined cooling fan may be controlled to be attenuated-output, not rated-output, in order to relieve the overheat inside the projector or cool the projector (S310b).

To prevent overheat inside the projector, the light source part and cooling fan may be controlled to be attenuated-output, not rated-output (S310b) and the attenuated-output controlling step (S310b) may be continued for a predetermined time period (t1).

The attenuated-output means output that is smaller than the rated-output. If the size of the rated-output is 100, the attenuated-output may be between 75 and 100.

The attenuated-output may be the least output of the controllable lamp configured of the light source part. That is, the attenuated-output is the least output of the lamp reduced as much as possible with the lamp of the light source part maintaining an operational state. For example, if the rated-output of the lamp is 100, the rated-output reduced as much as possible is 80 and the attenuated-output of the lamp may be 80.

At this time, the output of the cooling fan, that is, the rotation speed of the cooling fan may be attenuated-output, that is, attenuated-speed. This is because the electric power consumed inside the projector has to be minimized and because the overheat state has to be relieved smoothly. If the cooling fan is rotated at a high rotation speed, severe noise will be generated. If the light source part is attenuated-output, the cooling fan also may be controlled to be attenuated-output.

Accordingly, the attenuated-output means the smaller output than the rated-output and the controllable least output. If the attenuated-output is used as least controllable output, the heat generated by the lamp may be minimized.

If the second external air temperature comparing step (S210b) determines that the temperature of the external air (T0) is between the first temperature (Tw) and the second temperature (Ts), it means that the projector inside has an environment subject to overheat, with the external air having a not too high temperature to use the projector.

If the second external air temperature comparing step (S210b) determines that the external air temperature (To) be between the first temperature (Tw) and the second temperature (Ts), the initial operation determining step (S220b) is performed to determine whether the projector is put into initial-operation.

If the projector is initially-operated, with the external air temperature (To) between the first temperature (Tw) and the second temperature (Ts), it means that the temperature of the space having the projector installed therein is high and it is an environment making the projector subject to the overheat.

As a result, if the external air temperature (To) is between the first temperature (Tw) and the second temperature (Ts), the light source part is controlled to be attenuated-output (S310b) in order to prevent the overheat of the projector.

The step of controlling the light source part attenuated-output (S310b) may be continued for a predetermined time period (s2). After the light source part is controlled to be attenuated-output for the predetermined time period (t2), the starting step is performed again.

In contrast, if it is determined the projector is not initially-operated with the external air temperature (To) between the first temperature (Tw) and the second temperature (Ts), the temperature difference (ΔT) is compared with the second temperature (S220c).

If the external air temperature (To) is between the first temperature (Tw) and the second temperature (Ts), for example, an external air condition of approximately 38° C., it means that the indoor temperature of the space having the projector is used is high.

As a result, if the projector is rated-output in an initial operation normally, the projector might be overheated easily. Because of that, the light source and cooling fan are controlled to be not rated-output but to be attenuated-output (S310c). This step controlling the light source and the like to be attenuated-output (S310c) may be continued for a predetermined time period (t2).

After the step controlling the light source and the like be attenuated-output is performed for the predetermined time period (t2), the starting step will be performed again.

The light source part and cooling fan are controlled to be attenuated-output, not rated-output and it means brightness of the image using the projected light is decreased. If it is identified that the projector is not overheated by the attenuated-output during the time period, it is preferable that the lamp and so on may be controlled to be rated-output.

The light source part and cooling fan are controlled to be rated-output (S310d), if the second temperature difference comparing step (s220c) comparing the temperature difference between the internal air temperature and the external air temperature of the projector determines that the temperature difference (ΔT) is the second value (Cw2) or smaller after a predetermined time period, even with the attenuated-output controlling during the initial operation of the projector.

If not in the environment having the external air temperature (To) changes radically, the decreased temperature difference (ΔT) means that the temperature of the discharged internal air is decreased and it means efficient cooling is performed accordingly. If the temperature difference (ΔT) is maintained at the second value (Cw2) or more, the light source and cooling fan are controlled to be attenuated-output, not rated-output continuously (S310e). This step controlling the light source part and the like to be attenuated-output may be continued for a predetermined time period (t3).

If the projector is forcibly operated in case the external air temperature (To) is higher than the second temperature (Ts), this temperature means a temperature which will damage the inner parts of the projector or deteriorate product reliability. Because of that, the operation of the light source and cooling fan will be stopped (S310f).

At this time, the first value (Cw1) and second value (Cw2) are used as determination index to determine overheat inside the projector and they may be determined in consideration of characteristics of the projector.

As follows, the embodiment of the control method of the projector capable of cooling itself efficiently will be described in reference to TABLES 1 and 2, by using actual examples of the projector temperature.

TABLE 1 shows a control method of the light source part corresponding to changes of both the external air temperature (To) and the temperature difference (ΔT), in case that the external air temperature (To) is 35° C. or lower in the initial operation of the projector. TABLE 2 shows a control method of the light source part corresponding to changes of both the external air temperature (To) and the temperature difference (ΔT), in case the external air temperature (To) is in a rage of 35° C.~43° C. in the initial operation of the projector.

TABLE 1

|  | External Air Temperature (To) | Internal Air Temperature (Ti) | Temperature Difference (ΔT) | Light Source Part Output |
|---|---|---|---|---|
| First Normal Mode (Initial Operation) | 35° C. Or Lower | 35° C. or Lower |  | 100% |
| Second Normal Mode | 35° C. Or Lower | 74° C.~78° C. | 44° C. Or Lower | 100% |
| Third Cooling Mode | 35° C. Or Lower | 74° C.~78° C. | 44° C. Or Higher −>Continued For Predetermined Time Period | 80% −>Reducing Speed Of At Least One Cooling Fan |
| Fourth Normal Mode | 35° C. Or Lower | 74° C.~78° C. | 44° C. Or Lower | 100% |
| Fifth Normal Mode | 35° C.~43° C. | 73° C. Or Lower | 38° C. Or Lower | 100% |
| Sixth Cooling Mode | 35° C.~43° C. | 73° C. Or Higher | 38° C. Or Higher −>Continued For Predetermined Time Period | 80% −>Reducing Speed Of At Least One Cooling Fan |
| Seventh Normal Mode | 35° C.~43° C. | 73° C. Or Lower | 38° C. Or Higher | 100% |
| Eighth Forcible-finishing | 43° C. Or Higher |  |  | Finishing Projector Operation |

TABLE 2

|  | External Air Temperature (To) | Internal Air Temperature (Ti) | Temperature Difference (ΔT) | Light Source Part Output |
|---|---|---|---|---|
| First Cooling Mode (Initial Operation) | 35° C.~43° C. | 35° C.~43° C. | −>Continued For Predetermined Time Period | 80% −>Reducing Speed Of At Least One Cooling Fan |
| Second Normal Mode | 35° C.~43° C. | 73° C. or Lower | 38° C. or Lower | 100% |
| Third Cooling Mode | 35° C.~43° C. | 73° C. or Higher | 38° C. or Higher −>Continued For Predetermined Time Period | 80% −>Reducing Speed Of At Least One Cooling Fan |
| Fourth Normal Mode | 35° C.~43° C. | 73° C. or Lower | 38° C. or Lower | 100% |
| Fifth Forcible-Finishing | 43° C. or Higher |  |  | Finishing Projector Operation |

TABLE 1 shows changes of the light source part output based on the external air temperature (To) and the internal air temperature (Ti) of the projector. The case of the light source part output corresponding to 100% may be categorized in the normal mode and the case of the light source part output corresponding to 80% may be categorized in the cooling mode.

According to TABLE 1, the first temperature (Tw) is 35° C. and the second temperature (Ts) is 43° C. As a result, the control may be changeable according to which range the external air temperature (To) belongs to.

First of all, it is assumed that the external air temperature (To) is equal to the internal air temperature (Ti) in the first normal mode operating the projector initially. The overheating inside the projector inside is not considered in the first normal mode and the light source part and cooling fan are determined to be rated-output.

In the temperature range of the first temperature (Tw) or lower that is 35° C. or lower, the control method is changeable with each temperature difference (ΔT) in a range of 44° C. (the first value (Cw1)) or lower and higher, as shown in the second normal mode, the third cooling mode and the fourth normal mode.

That is, if the temperature difference (ΔT) is 44° C. or lower, the light source part and cooling fan are controlled normally (the second normal mode). If the temperature difference (ΔT) is 44° C. or higher, the third cooling mode starts to decrease the output of the light source down to 80% and the speed of the at least one cooling fan is decreased such that the cooling mode is performed for the predetermined time period.

If the temperature difference (ΔT) is decreased down to 44 or lower from 44 or lower based on the result of the third cooling mode performance, is can be determined that the projector inside is cooled down appropriately and the output of both the light source part and the cooling fan are controlled to return to the rated-output (the fourth normal mode).

If the external air temperature (To) increased to be in the range between the first temperature (Tw) and the second temperature (Ts), the temperature difference (ΔT) may have a new reference temperature of 38° C.

If the external air temperature (To) is between the first temperature (Tw, 35° C.) and the second temperature (Ts, 43° C.), with the temperature difference being 38° C. or lower, the fifth normal mode is performed and the light source part and cooling fan are determined to be rated-output. As the projector is put into normal operation even with the high external air temperature (To), the cooling mode may not be performed based on only the external air temperature (To).

If the external air (To) is between the first temperature (Tw, 35° C.) and the second temperature (Ts, 43° C.), with the projector put into initial operation, the operation of the projector starts in the cooling mode and this fifth normal mode is a condition that it is identified that the temperature of the projector inside is not increased nor decreased drastically, not the initial operation. As a result, the projector may be operated normally in the fifth normal mode.

If the external air temperature (To) is between the first temperature (Tw, 35° C.) and the second temperature (Ts, 43° C.), with the temperature difference (ΔT) being 38° C. or higher, the sixth cooling mode is performed to decrease the output of the light source part down to 80% of the rated-output and the rotation speed of the at least one cooling fan is decreased such that the cooling mode (the sixth cooling mode) may be performed.

If the temperature difference (ΔT) is decreased down to 38° C. or lower based on the result of the six cooling mode, the light source part and cooling fan may be controlled normally (the seventh normal mode). Here, if the temperature difference (ΔT) is maintained at 38° C. or higher, the six cooling mode may be continued.

If the external air temperature (To) is increased higher than the range between the first temperature (Tw, 35° C.) and the second temperature (Ts, 43° C.) only to be higher than the second temperature (Ts, 43° C.), this increased temperature is corresponding to a temperature range making the projector not operated normally and the operation of the projector may be finished (the eighth forcible-finishing).

TABLE 2 shows output changes of the light source based on both of the external air temperature (To) and the internal air temperature (Ti). The case having the output of the light source part corresponding to 100% which is the rated-output may be categorized in the normal mode and the case having the output of the light source part corresponding to 80% which is the attenuated-output may be categorized in the cooling mode, as mentioned above, and repeated explanation will be omitted.

If the projector is put into initial-operation with the external air temperature (To) between the first temperature (Tw, 35° C.) and the second temperature (Ts, 43° C.), the projector has the first cooling mode and this first cooling mode is the environment having the projector inside easily overheated. As a result, the projector is controlled in the cooling mode even when put into initial operation.

The first cooling mode is continued for the predetermined time period as initial operation. After that, the projector may be controlled in the second normal mode, third cooling mode or fourth normal mode based on whether the temperature difference is 38° C. or lower or higher, or whether it is decreased down to 38° C. or lower, with the external air temperature (To) is between the first temperature (Tw, 35° C.) and the second temperature (Ts, 43° C.). This is identical to the case shown in TABLE 1.

In case of the normal mode, it means that the light source part is controlled to be rated-output and in case of the cooling mode, the light source part and the like are controlled to be attenuated-output.

If the external air temperature (To) is increased up to the second temperature (Ts, 43° C.) or higher like the case having the external air (to) being 35° C. or lower in the initial operation of the projector, the operation of the projector may be finished to protect the inner parts of the projector.

Figure 6:
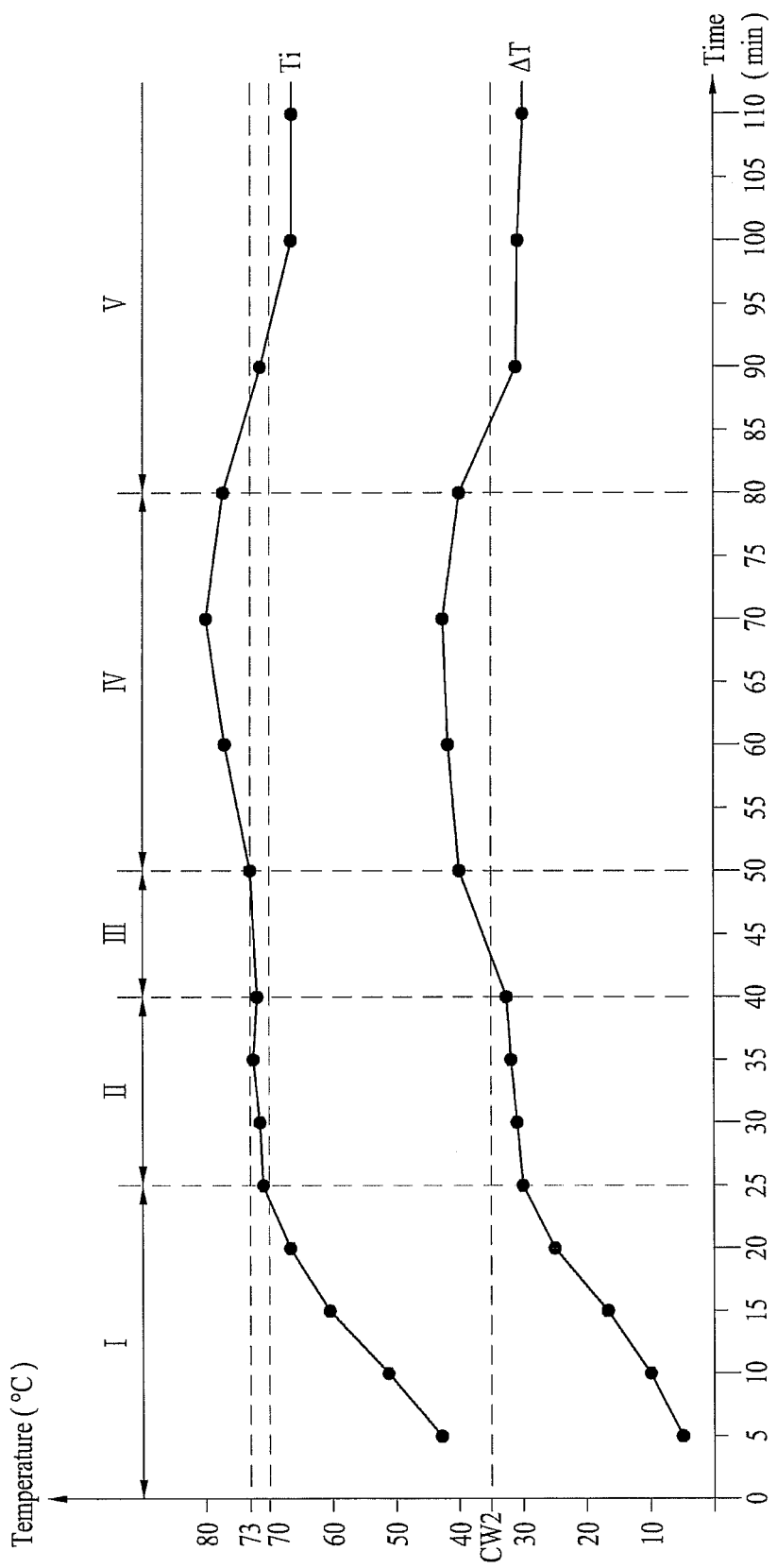
FIG. 6 is a graph illustrating an example of changes of internal air temperatures (Ti) and of temperature difference ($\Delta T$) of the projector controlled according to the control method of the present invention.

FIG. 6 is a diagram illustrating examples of the internal air temperature (Ti) and the temperature difference (ΔT) of the projector controlled by the control method according to the present invention.

A graph of FIG. 6 showing the changes of the internal air temperature (Ti) and the temperature difference (ΔT), if the external air temperature (To) be in the range between 35° C.~43° C. Specifically, FIG. 6 is a graph illustrating the example shown in TABLE 2.

If the projector is put into operation, the projector may be controlled in the cooling mode as initial operational method in 'I' section. That is, the output of the light source part is controlled at the smaller output than the rated-output, for example, 80% and the cooling fan may be operated with the reduced rotation speed.

If it is identified that the temperature difference (ΔT) is maintained at the second value or lower for the predetermined time period, the projector is controlled in the normal mode as shown in 'II' section. The internal air temperature (Ti) and the temperature difference (ΔT) are increased slowly in 'II' section and the internal air temperature (Ti) is maintained at a predetermined temperature section (73° C. or lower) in 'II' section.

However, if the temperature difference (ΔT) is maintained at the second value (Cw2) or higher after the internal air temperature (Ti) is increased up to the second value (Cw2, approximately 38° C.), as shown in 'III' or 'IV' section, the projector is controlled in the cooling mode.

The output of the lamp composing the light source part may be controlled not to be rated-output, for example, 80% of the rated-output and the rotation speed of the cooling fan may be decreased.

If the cooling mode is continued for the predetermined time period, the internal air temperature (Ti) of the projector is decreased together with the temperature difference (ΔT) such that the temperature difference (ΔT) may be decreased down to the second value (Cw2) or lower.

if the temperature difference (ΔT) is the second value (Cw2) or lower even with the external air temperature (To) being a high temperature between the first temperature (Tw, 35° C.) and the second temperature (Ti, 43° C.), the stable operation of the projector ma be secured.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method for controlling a projector comprising:
a temperature measuring step measuring a temperature of a projector;
a light source part output determining step determining a light source part to be rated-output when the temperature measured in the temperature measuring step is less than or equal to a predetermined temperature and to be attenuated-output when the temperature measured in the temperature measuring step is greater than the predetermined temperature; and
a light source part controlling step controlling the light source part according to the light source part output determined in the light source part output determining step,
wherein the projector comprises at least one cooling fan,
wherein, when the temperature measured in the temperature measuring step is less than or equal to the predetermined temperature, the at least one cooling fan is controlled at a rated-output, and
wherein, when the light source part output determining step determines the light source part to be attenuated-output, the at least one cooling fan is controlled at an attenuated-output.

2. The method of claim 1, wherein the light source part controlling step controlling the light source part to be attenuated-output based on the light source part output determined in the light source part output determining step is operated for a predetermined time period.

3. The method of claim 2, wherein the temperature measuring step is repeated at a predetermined interval, and the light source part output determining step determines the light source part to be rated-output and the light source part controlling step controls the light source part to be rated-output, in case the temperature of the projector decreases to a predetermined temperature or lower during the light source part controlling step.

4. The method of claim 1, wherein the temperature of the projector comprises at least one of a temperature inside the projector and a temperature of air discharged from the projector.

5. The method of claim 4, wherein the temperature inside the projector comprises at least one of a temperature of an area near the light source part and a temperature of an area near a display panel.

6. A method for controlling a projector comprising:
a temperature measuring step measuring a temperature of external air drawn into the projector to cool the projector and a temperature of internal air discharged from the projector;
a light source part and cooling fan output determining step determining output of a light source part and cooling fan, respectively, which are provided in the projector, based on the external air temperature and temperature difference between the internal air temperature and the external air temperature; and
a light source part and cooling fan controlling step controlling the light source part and the cooling fan based on the light source part and cooling fan output determined in the light source part and cooling fan output determining step,
wherein the light source part and cooling fan output determining step determines either the light source part and the cooling fan to output at a rated-output or the light source part and the cooling fan to output at an attenuated-output which is less than the rated-output, based on the external air temperature and the temperature difference.

7. The method of claim 6, wherein the temperature measuring step and the light source part and cooling fan output determining step are repeated at a predetermined interval.

8. The method of claim 7, wherein the light source part and cooling fan output determining step determines the light source part and the cooling fan to be rated-output in case the external air temperature measured in the temperature measuring step is a first temperature or lower and the temperature difference is a first value or lower.

9. The method of claim 7, wherein the light source part and cooling fan output determining step determines the light source part and the cooling fan to be attenuated-output, which is less than the rated-output, in case the external air temperature measured in the temperature measuring step is the first temperature or lower and the temperature difference is the first value or higher.

10. The method of claim 9, wherein the light source part and cooling fan output determining step determines the light source part to be attenuated-output in case the temperature difference is maintained at the first value.

11. The method of claim 9, wherein the light source part and cooling fan output determining step determines the light source part and the cooling fan to be rated-output in case temperature difference is decreased down to the first value or lower.

12. The method of claim 7, wherein the light source part and cooling fan output determining step determines the light source part and the cooling fan to be attenuated-output, which is less than the rated-output, and the light source part and cooling fan controlling step controls the light source part and the cooling fan to be attenuated-output for a predetermined time period, in case the projector is put into initial operation in a state of the external air temperature measured in the temperature measuring step being higher than the first temperature and lower than the second temperature.

13. The method of claim 12, wherein the light source part and cooling fan output determining step determines the light source part and the cooling fan output to be rated-output in case the temperature difference between the inlet air temperature and the outlet air temperature is a second value or lower.

14. The method of claim 12, wherein the light source part and cooling fan output determining step determines the light source part and the cooling fan to be attenuated-output and the light source part and cooling fan controlling step controls the light source part and the cooling fan to be attenuated-output for a predetermined time period, in case the temperature difference between the external air temperature and the internal air temperature is the second value or higher.

15. The method of claim 9, wherein the attenuated-output is substantially more than 75% and less than 100% of the rated-output.

16. The method of claim 15, wherein the attenuated-output of the light source part is 80% of the rated-output of the light source.

17. The method of claim 15, wherein the attenuated-output is substantially the least output which is controllable.

18. The method of claim 9, wherein the first temperature is a temperature between 35° C. and 40° C.

19. The method of claim 12, wherein the second temperature is a temperature of 40° C. or more.

\* \* \* \* \*